United States Patent
Wiebe et al.

(10) Patent No.: US 9,388,738 B2
(45) Date of Patent: Jul. 12, 2016

(54) CASING FOR A GAS TURBINE ENGINE

(75) Inventors: David J. Wiebe, Orlando, FL (US);
David A. Little, Chuluota, FL (US);
Richard C. Charron, West Palm Beach, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1280 days.

(21) Appl. No.: 13/252,325

(22) Filed: Oct. 4, 2011

(65) Prior Publication Data

US 2013/0081399 A1  Apr. 4, 2013

(51) Int. Cl.
F01D 9/02 (2006.01)
F02C 3/14 (2006.01)
F23R 3/46 (2006.01)
F23R 3/02 (2006.01)

(52) U.S. Cl.
CPC . *F02C 3/14* (2013.01); *F01D 9/023* (2013.01); *F23R 3/02* (2013.01); *F23R 3/46* (2013.01)

(58) Field of Classification Search
CPC .............. F01D 9/023; F02C 3/14; F23R 3/46
USPC .................................................. 60/752–760
See application file for complete search history.

(56) References Cited

U.S. PATENT DOCUMENTS

| | | | | |
|---|---|---|---|---|
| 2,650,060 A * | 8/1953 | Stalker | | 415/68 |
| 3,088,279 A * | 5/1963 | Diedrich | | 60/804 |
| 3,650,106 A * | 3/1972 | Guillot | | 60/748 |
| 4,129,985 A * | 12/1978 | Kajita et al. | | 60/39.37 |
| 4,928,481 A * | 5/1990 | Joshi et al. | | 60/737 |
| 5,353,586 A * | 10/1994 | Taylor et al. | | 60/39.37 |
| 5,921,075 A * | 7/1999 | Shimoyama et al. | | 60/797 |
| 6,374,594 B1 * | 4/2002 | Kraft et al. | | 60/39.37 |
| 7,721,547 B2 * | 5/2010 | Bancalari et al. | | 60/752 |
| 2005/0016178 A1 * | 1/2005 | Wasif et al. | | 60/752 |
| 2006/0245926 A1 * | 11/2006 | Hillier et al. | | 416/204 R |
| 2008/0034759 A1 * | 2/2008 | Bulman et al. | | 60/796 |
| 2009/0255266 A1 * | 10/2009 | Varanasi et al. | | 60/752 |
| 2010/0037617 A1 * | 2/2010 | Charron et al. | | 60/752 |
| 2010/0077719 A1 * | 4/2010 | Wilson et al. | | 60/39.37 |
| 2010/0115953 A1 * | 5/2010 | Davis et al. | | 60/737 |
| 2010/0115966 A1 * | 5/2010 | Nagai et al. | | 60/800 |
| 2011/0004390 A1 * | 1/2011 | Nomura et al. | | 701/100 |

FOREIGN PATENT DOCUMENTS

| | | |
|---|---|---|
| CN | 101737801 A | 6/2010 |
| GB | 2247521 A | 3/1992 |
| WO | 2008037554 A2 | 4/2008 |

\* cited by examiner

*Primary Examiner* — Arun Goyal

(57) ABSTRACT

A casing for a can annular gas turbine engine, including: a compressed air section (40) spanning between a last row of compressor blades (26) and a first row of turbine blades (28), the compressed air section (40) having a plurality of openings (50) there through, wherein a single combustor/advanced duct assembly (64) extends through each opening (50); and one top hat (68) associated with each opening (50) configured to enclose the associated combustor/advanced duct assembly (64) and seal the opening (50). A volume enclosed by the compressed air section (40) is not greater than a volume of a frustum (54) defined at an upstream end (56) by an inner diameter of the casing at the last row of compressor blades (26) and at a downstream end (60) by an inner diameter of the casing at the first row of turbine blades (28).

9 Claims, 5 Drawing Sheets

CASING FOR A GAS TURBINE ENGINE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to casings for gas turbine engines. In particular this invention relates to a casing section between the compressor and the turbine.

BACKGROUND OF THE INVENTION

Conventional industrial gas turbine engines are enclosed by an annular engine casing. Engine casings commonly include a turbine casing, a combustor casing, and a turbine casing bolted together. In a can annular gas turbine engine the combustors are disposed in an annular array about a centerline of the gas turbine engine. These combustors may extend radially outward further than the compressor and turbine components adjacent to the combustors. Consequently, in order to enclose the combustors the compressor casing must bulge radially outward further than the adjacent portions of the compressor and turbine casings. In some designs radially outer ends of combustors extend through the combustor casing and are enclosed with a cap ("top hat"). However, even in casings that utilize top hats, the combustor casing still bulges radially outward. Furthermore, emerging advanced transition designs reposition combustors even further radially outward. Thus there exists room in the art for improved casing design.

BRIEF DESCRIPTION OF THE DRAWINGS

The invention is explained in the following description in view of the drawings that show.

DETAILED DESCRIPTION OF THE INVENTION

Figure 1:
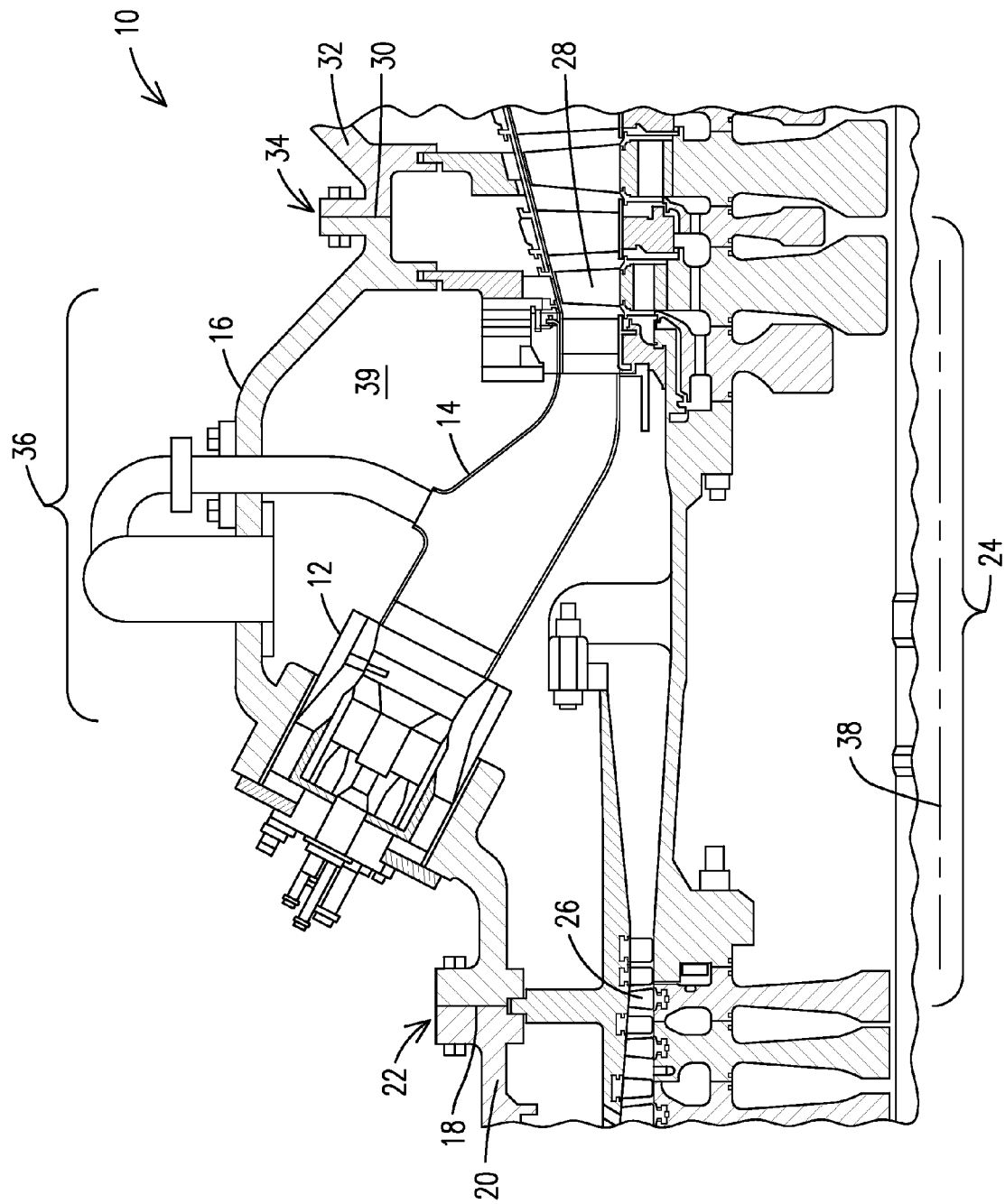
FIG. 1 shows a partial cross section for a casing for a can annular gas turbine engine with a conventional combustor and transition.

The present inventors have recognized that conventional combustor casing designs utilized for can annular combustors can be improved upon when a gas turbine engine utilizes an advanced transition combustion system. One example of an advanced transition design is disclosed in U.S. Pat. No. 7,721,547 to Bancalari et al. Similar to conventional can annular gas turbine engine combustor designs, advanced transition combustion systems comprise an array of combustors disposed annularly about a gas turbine engine's centerline. However, in advanced transition designs a first row of vanes commonly present in conventional gas turbine engines is eliminated. Instead, combustion gasses flow along a straight flow path from the combustor until accelerated up to a speed appropriate for delivery to the first row of turbine blades. In some advanced transition designs the combustion gasses continue on a straight flow path when delivered to the first row of turbine blades. In other advanced transition designs the combustion gasses unite with combustion gasses from adjacent combustors and a single unified flow is delivered to the first row of turbine blades. However, in all of these advanced transition designs the combustors are oriented radially outward to a greater degree to achieve a proper direction of flow for the combustion gasses. Consequently, in order to enclose the combustors utilizing conventional annular combustor casing practices a substantial annular combustor casing would be necessary.

The present inventors have devised a unique casing for a gas turbine engine utilizing advanced transition combustor designs. Contrary to prior combustion casing designs where a compressor casing, a combustor casing, and a turbine casing are formed by bolting sections together, the gas turbine engine casing design disclosed herein essentially eliminates a conventional combustor casing section and replaces it with what will be termed a "compressed air casing" that includes a compressed air annular section and a plurality of combustor assembly covers. (As used herein a combustor assembly is a combustor and the associated ducting necessary to convey the combustion gasses to the first row of turbine blades.) The compressed air section essentially encloses a portion of the gas turbine engine from a last row of compressor blades to a first row of turbine blades. The compressed air section essentially takes a most feasible and direct route between the compressor casing at the last row of compressor blades and the turbine casing at the first row of turbine blades, and simply leaves openings where the combustor assemblies extend radially through. The openings are covered with individual covers, known as "top hats" that enclose the portion of the combustor assembly extending past the compressed air section and seal the opening.

Thus, this design provides for a smaller annular portion (the compressed air section) of the casing surrounding the combustor and more substantial top hats enclosing more of the combustor assemblies than the prior art. Using more substantial top hats to enclose more of the combustor assemblies permits a substantial reduction in the radius of the annular section. Reducing the radius of the annular portion of the casing can allow for a thinner wall and smaller overall size of the annular section. By virtue of their shape top hats can readily absorb forces generated by the compressed air not enclosed by the annular portion. Specifically, as a generally cylindrical shape the top hats can absorb force about their circumference readily, and force on a radially outward end is manageable due to the small area of the radially outward end surface. As a result, several light, relatively inexpensive, and manageable top hats can be used to reduce the wall thickness and overall size of the annular portion.

Turning to the figures, FIG. 1 shows a prior art conventional industrial gas turbine engine 10 with a combustor 12 and a transition 14. A conventional combustor casing 16 is joined to an aft end 18 of a compressor casing 20 via a compressor casing-to combustor casing flange arrangement 22. The conventional combustor casing 16 spans a length 24 of the gas turbine engine 10 from proximate the last row of compressor blades 26 to proximate a first row of turbine blades 28. The conventional combustor casing 16 is joined to a fore end 30 of a turbine casing 32 via a combustor casing-to turbine casing flange arrangement 34. It can be seen that the combustor casing 16 comprises a bulge 36 that expands radially outward from a centerline 38 of the gas turbine engine to beyond the aft end 18 of the compressor casing 20 and beyond the fore end 30 of the turbine casing 32. Plenum 39 comprises compressed air and this compressed air generates significant force on the combustor casing 16. As the radius of the bulge 36 increases, the forces on the combustor casing 16 increase exponentially. Consequently conventional combustor casings 16 must be thick and heavy to accommodate the forces generated by the compressed air.

Figure 2:
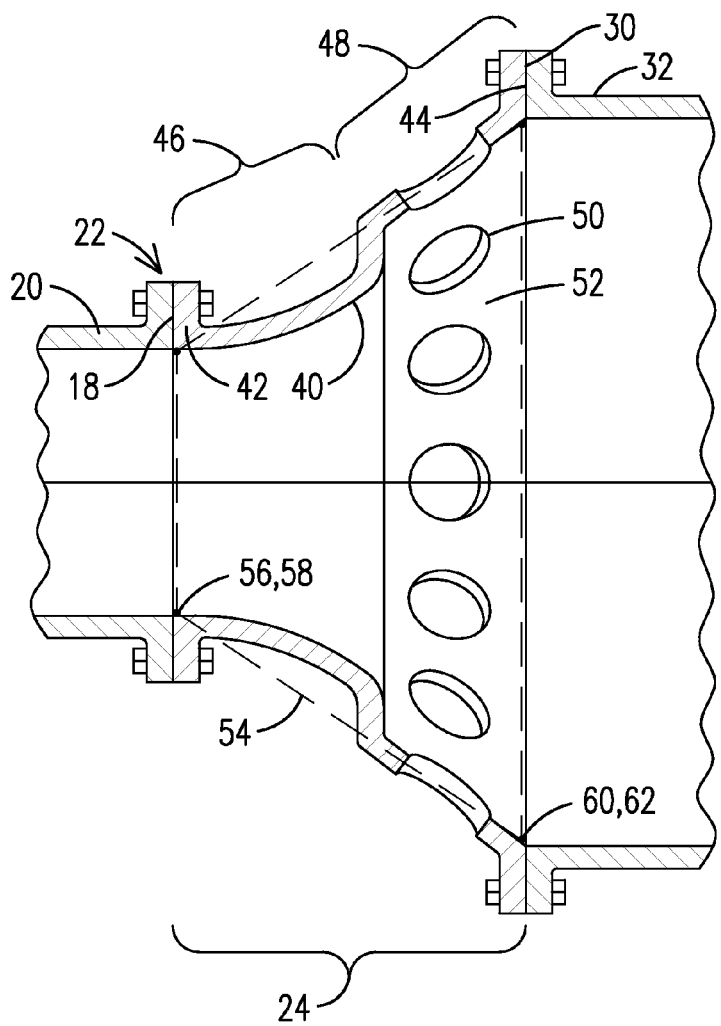
FIG. 2 shows a cross section of an embodiment of a compressed air section of a casing for a gas turbine engine.

FIG. 2 shows a schematic representation of a compressed air casing comprising the compressed air section 40 (the annular portion of the casing) attached at an upstream end 42 to the aft end 18 of the compressor casing 20, and at a downstream end 44 to the fore end 30 of the turbine casing 32. The compressed air section 40 may be considered to have an upstream portion 46 and a downstream portion 48. The downstream portion 48 may have a plurality of openings 50 disposed in an array about the centerline of the gas turbine engine and located such that combustor assemblies (not pictured) can extend radially outward there through. The openings 50 may be sized to permit access to and removal of an individual combustion assembly (not shown) there through. The compressed air section may comprise an upper half and a bottom half joined together around a rotor (not shown).

It can be seen that the compressed air section 40 encloses a decreased volume when compared to conventional combustor casings 16. Specifically, the compressed air section 40 encloses a volume that is radially bounded substantially by the inner surface 52 of the compressed air section 40 as if openings 50 were not present. In other words, a volume enclosed by the compressed air section 40 would have a radially outer surface that would conform to the inner surface 52 of the compressed air section 40 prior to the formation of the openings 50. It is understood that various shapes/profiles may be used by the compressed air section 40 to span the length of the gas turbine engine from the aft end 18 of a compressor casing 20 to the fore end 30 of a turbine casing 32. Whatever profile is chosen, minimizing a radius of the compressed air section 40 (the annular portion of the compressed air casing) at all locations along the length 24 of the gas turbine engine (i.e. a radius profile) is a desirable design factor. This minimize the forces generated on the compressed air section 40 by the compressed air enclosed thereby.

It is further understood that while minimizing the radius profile is a design factor in order to reduce the thickness required (in order to accommodate the forces) and the overall size (to ease manufacturing and shipping etc), other factors may supersede, such as other structural requirements including attachment points, fillet radius control, access etc. Consequently, the design is not limited to a specific radius profile, or volume, or surface area etc. In general terms, the volume enclosed by the compressed air section 40 may be slightly more than would be a volume enclosed by a frustum 54 (indicated by a dotted line) defined at an upstream end by an inner perimeter 58 of the aft end 18 of the compressor casing 20, and at a downstream end 60 by an inner perimeter 62 of the fore end 30 of the turbine casing 32. In some embodiments the volume enclosed by the compressed air section 40 will be roughly equivalent to or less than that enclosed by frustum 54. In various embodiments portions of the inner surface 52 of the compressed air section 40 may comprise a radius greater than that of the frustum 54 while a total enclosed volume may still be less than enclosed by the frustum 54.

In other embodiments the total enclosed volume may be roughly the same or even slightly larger than that of the frustum 54. In some embodiments the radius may always be equal to or less than that of the frustum 54 at the same axial position. However, when compared to the bulge 36 of the prior art, the volume enclosed by the compressed air section 40 will be substantially less. As a result of the reduced radius profile, volume, effective surface area etc, the compressed air section 40 will experience reduced forces from the compressed air enclosed therein, and thus may be much lighter, smaller, less expensive, and easier to transport than the prior art combustor casing.

Figure 3:
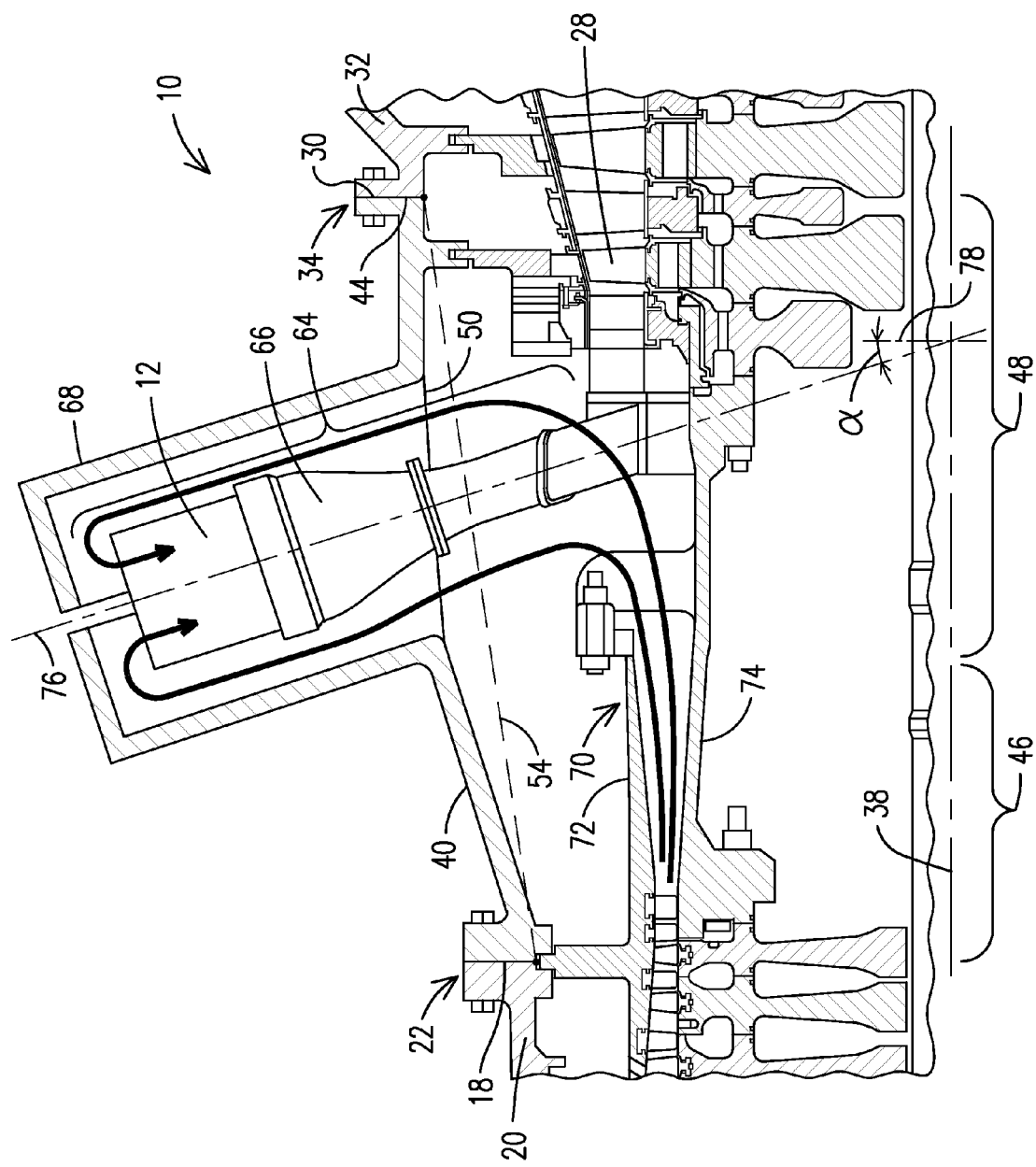
FIG. 3 shows a partial cross section of an embodiment of a compressed air section with a top hat cover.

FIG. 3 shows an embodiment of the compressed air section 40 in a gas turbine engine with a top hat 68 enclosing a portion of an advanced duct 66 of a combustor/advanced duct assembly 64 that includes a combustor 12 and the advanced duct 66. The top hats 68 may be bolted or otherwise joined to the compressed air section 40 using techniques known to those of ordinary skill in the art. As can be seen, an amount of compressed air enclosed by the compressed air section 40 and the top hats 68 will be influenced by how much of a length of the combustor/advanced duct assembly 64 is enclosed by the top hats 68. The longer the top hat 68, the smaller the downstream portion 48 of the compressed air section 40 may be. As downstream portion 48 decreases in size forces experienced by the compressed air portion 40 decrease. In an embodiment the top hat 68 may enclose a majority of a combined length of the combustor 12 and the advanced duct 66. Also evident in this embodiment is that the compressed air section 40 comprises a larger radius than frustum 54 at some or all of the locations along the centerline 38 of the gas turbine engine. This is acceptable because the top hat 68 encloses more of a length of the combustor/advanced duct assembly 64 than do prior art designs, and thus the compressed air section 40 will still experience less force than do the prior art designs. Also visible in a separate diffuser 70 comprising a diffuser outer wall 72 and a diffuser inner wall 74. In certain designs a top hat centerline 76 may intersect a plane 78 perpendicular to the centerline 38 of the gas turbine engine at approximately an angle a of 30 degrees or less. In an embodiment the angle a may be approximately 17 degrees.

Figure 4:
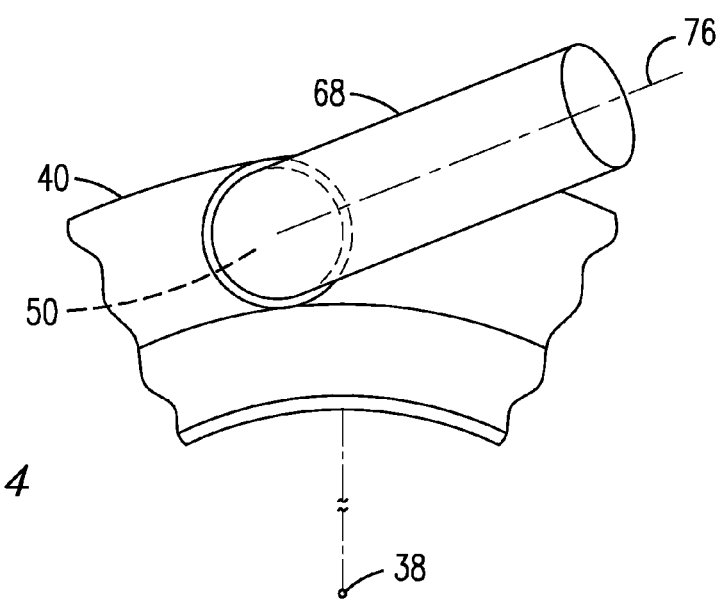
FIG. 4 shows a partial view of an embodiment of a compressed air section and a top hat looking toward downstream.

FIG. 4 shows a portion of the compressed air section 40 looking from upstream to downstream along the centerline 38 of the gas turbine engine. It can be seen that the top hat 68 may be angled such that a top hat centerline 76 does not intersect the centerline 38 of the gas turbine engine. This may occur for various design reasons. For example, a longitudinal axis of some advanced transition duct assemblies disposed within the top hat 68 may not intersect with the centerline 38 of the gas turbine engine. Instead, the longitudinal axis of some advanced transition duct assemblies may be canted in a manner similar to the cant of the top hat 68 shown in FIG. 4. In such a design, when viewed from upstream as in FIG. 4, the longitudinal axis of the advanced transition duct assemblies may be tangential to a turbine inlet annulus immediately upstream of the first row of turbine blades 28 (not shown). In some advanced transition designs the advanced transition duct assemblies may unite in an annular chamber prior disposed adjacent the turbine inlet annulus which is in turn upstream of the first row of turbine blades 28 (not shown). Likewise, in such a design, when viewed from upstream as in FIG. 4, the longitudinal axis of the advanced transition duct assemblies may be tangential to the annular chamber. Similarly, the top hat centerline 76 may also be tangential to the turbine inlet annulus and/or the common annular chamber when viewed from upstream as in FIG. 4. This is particularly so when the top hat centerline 76 coincides with the longitudinal axis of the advanced transition duct assemblies. Opening 50 may take various shapes as necessary to accommodate any inclination of the combustor assembly (not shown), such as an oval etc. Various orientations are a matter of design choice and considered to be within the scope of the disclosure.

Figure 5:
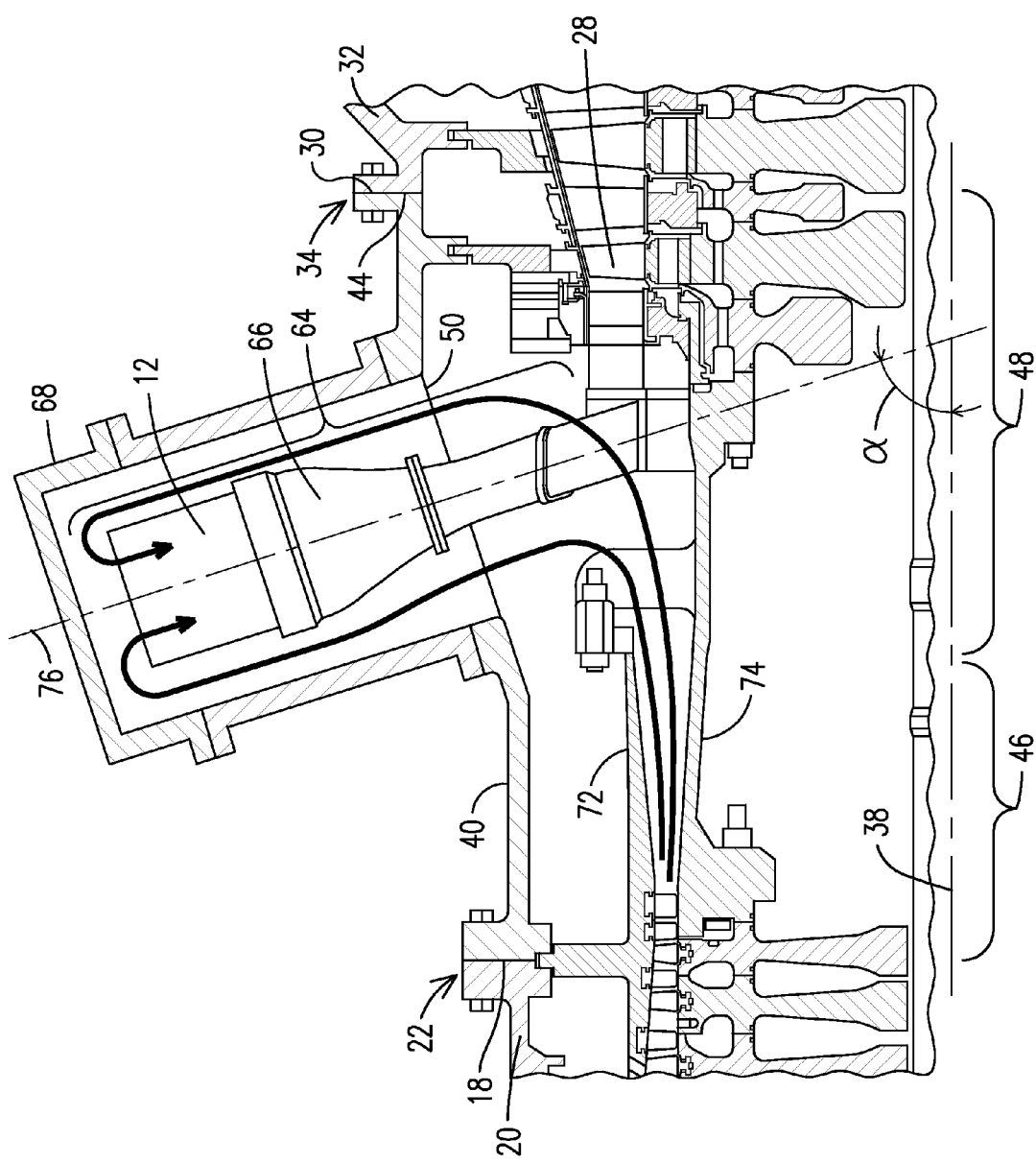
FIG. 5 shows a partial cross section of another embodiment of a compressed air section with a top hat cover.

Another embodiment of the compressed air section 40 is shown in FIG. 5. In this embodiment the upstream portion 46 of the compressed air section 40 extends axially from the aft end 18 of the compressor casing 20 until intersecting with the downstream portion 48. The exact point of intersection would be dictated by the angle of the upstream portion 46, and that may be influenced by the angle a between the top hat centerline 76 and a plane 78 perpendicular to the centerline 38 of the gas turbine engine.

Figure 6:
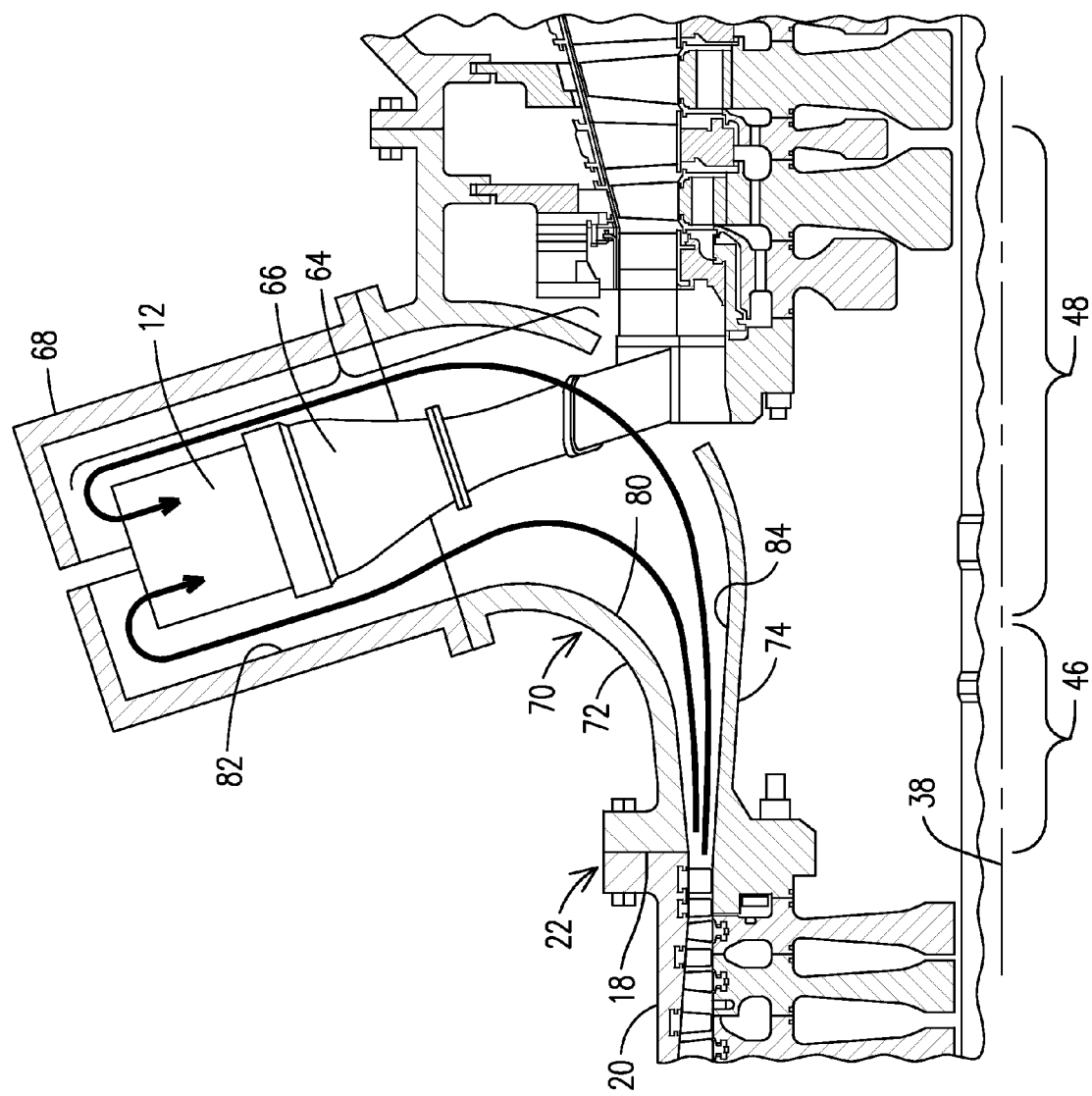
FIG. 6 shows a partial cross section of yet another embodiment of a compressed air section with a top hat cover, where the compressed air section acts as part of a diffuser.

Yet another embodiment is depicted in FIG. 6. In this embodiment the upstream portion 46 of the compressed air section 40 also acts as the diffuser outer wall 72. In such an embodiment the upstream portion 46 may comprise a curved shape as shown, or any shape as necessary. The upstream portion 46 may blend smoothly into the downstream portion 48, and further an inside surface 80 of the upstream portion 46 and/or downstream portion 48 may blend smoothly with an associated portion of the inside surface 82 of the top hat 68. Likewise, an outer surface 84 of the diffuser inner wall 74 may also blend smoothly with an associated portion of the inside surface 82 of the top hat 68 to direct compressed air efficiently into the top hat 68 and eventually the combustor 12.

The casing of the present invention enables an annular portion with a significantly reduced radius. As a result the annular section may be made with a thinner wall, which decreases cost and weight. Further, the annular portion may be smaller in overall size which makes for an easier to handle and ship annular portion, which adds to the cost savings. In addition, a smaller casing allows for installing the gas turbine engine closer to the ground, yielding further savings.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A casing for a can annular gas turbine engine, comprising:
   a compressed air section comprising an upstream portion configured to secure to a compressor casing at a last row of compressor blades and a downstream portion configured to secure to a turbine casing at a first row of turbine blades such that the compressed air section, the compressor casing, and the turbine casing share a common longitudinal axis, the compressed air section further comprising a plurality of openings therethrough and arranged in an annular array having an origin located on the common longitudinal axis, wherein a respective combustor/advanced duct assembly extends through a respective opening of the plurality of openings; and
   one top hat from a plurality of top hats for each opening of the plurality of openings, each one of the plurality of top hats configured to attach to the compressed air section, to enclose the respective combustor/advanced duct assembly, and to seal the respective opening of the plurality of openings,
   wherein a volume enclosed by the compressed air section is not greater than a volume of a frustum that is defined at an upstream end by an inner diameter of the compressor casing at the last row of compressor blades and at a downstream end by an inner diameter of the turbine casing at the first row of turbine blades.

2. The casing of claim 1, wherein a longitudinal axis of each combustor/advanced duct assembly intersects a plane perpendicular to the common longitudinal axis at an angle of less than 30 degrees.

3. The casing of claim 1, wherein a largest inner diameter of the compressed air section does not exceed the inner diameter of the turbine casing at the first row of turbine blades.

4. The casing of claim 1, wherein the upstream portion of the compressed air section also acts as an outside wall of a diffuser, and wherein the outside wall guides compressed air.

5. The casing of claim 1, wherein the upstream portion of the compressed air section extends axially downstream from the compressor casing and toward the turbine casing while maintaining a same diameter, and the downstream portion connects the upstream portion with the turbine casing, wherein the downstream portion comprises the plurality of openings.

6. A casing for a can annular gas turbine engine, comprising:
   a compressed air section comprising an upstream portion configured to secure to a compressor casing at a last row of compressor blades and a downstream portion configured to secure to a turbine casing at a first row of turbine blades such that the compressed air section, the compressor casing, and the turbine casing share a common longitudinal axis, the compressed air section further comprising a plurality of openings therethrough and arranged in an annular array having an origin located on the common longitudinal axis, wherein a respective combustor and a respective advanced duct extend through- a respective opening of the plurality of openings, the respective advanced duct defining a fluid path between the respective combustor and the first row of turbine blades; and
   one top hat from a plurality of top hats associated with each opening of the plurality of openings, each one of the plurality of top hats configured to attach to the compressed air section, to seal a respective opening of the plurality of openings, and to surround a respective combustor as well as a portion of a respective advanced duct that provides fluid communication between the respective combustor and the first row of turbine blades,
   wherein the upstream portion of the compressed air section extends axially downstream from the compressor casing at the last row of compressor blades and toward the turbine casing while maintaining a same diameter, wherein the downstream portion connects the upstream portion with the turbine casing at the first row of turbine blades, and wherein the downstream portion comprises the plurality of openings.

7. The casing of claim 6, wherein each one of the plurality of top hats surrounds a majority of a combined axial length of the respective combustor and the respective advanced duct.

8. The casing of claim 6, wherein the upstream portion curves radially outward in a downstream direction and forms a diffuser outer wall that guides compressed air exiting a compressor.

9. The casing of claim 6, wherein each one of the plurality of top hats is sized to permit extraction of the respective combustor and the respective advanced duct extending there through.

* * * * *